United States Patent
Miller, Jr. et al.

(10) Patent No.: US 10,457,263 B2
(45) Date of Patent: Oct. 29, 2019

(54) BRAKE ADJUSTMENT DETECTION USING WSS BASED THERMAL MEASUREMENT

(71) Applicant: Bendix Commercial Vehicle Systems LLC, Elyria, OH (US)

(72) Inventors: Thomas S. Miller, Jr., Lagrange, OH (US); Joseph M. Macnamara, Ashland, OH (US); James E. Szudy, Parma, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 183 days.

(21) Appl. No.: 15/657,420

(22) Filed: Jul. 24, 2017

(65) Prior Publication Data

US 2019/0023252 A1   Jan. 24, 2019

(51) Int. Cl.
*B60T 17/22*   (2006.01)
*B60T 8/17*   (2006.01)
(Continued)

(52) U.S. Cl.
CPC .............. *B60T 17/221* (2013.01); *B60T 8/17* (2013.01); *B60T 8/171* (2013.01); *B60T 8/172* (2013.01);
(Continued)

(58) Field of Classification Search
CPC ........ B60T 17/18; B60T 17/22; B60T 17/221; B60T 2250/06; B60T 2270/30; B60T 2270/406; B60T 2270/411; B60T 2270/413; B60T 2270/416; B60T 8/17; B60T 8/171; B60T 8/172; B60T 8/1725; B60T 8/1755; B60T 8/17551; B60T 8/17555;
(Continued)

(56) References Cited

U.S. PATENT DOCUMENTS 6,050,649 A * 4/2000 Hensley ................. B60Q 1/441
                                                           188/158
6,612,736 B2   9/2003 Lee et al.
(Continued)

FOREIGN PATENT DOCUMENTS

DE   10243127 A1   3/2004
EP   0 189 082 A2   7/1986
(Continued)

*Primary Examiner* — Babar Sarwar
(74) *Attorney, Agent, or Firm* — Fay Sharpe LLP

(57) ABSTRACT

When detecting a maladjusted brake component on a commercial vehicle, wheel end temperature is determined as a function of resistance measured by a wheel speed sensor at a wheel end. The measured temperature is compared to low and high temperature thresholds defined by a thermal model, as well as to one or more other wheel speed sensor temperatures. If the measured temperature is below the low temperature threshold and substantially different than the one or more other wheel speed sensors, the brake is determined to be under-adjusted and brake force at the under-adjusted brake is increased. If the measured temperature is above the high temperature threshold and substantially different than the one or more other wheel speed sensors, then the brake is determined to be over-adjusted, and brake force is reduced or modulated at the over-adjusted brake to prevent overheating.

26 Claims, 4 Drawing Sheets

(51) Int. Cl.
  *B60T 8/171* (2006.01)
  *B60T 8/172* (2006.01)
  *B60T 8/1755* (2006.01)
  *B60T 8/176* (2006.01)
  *B60T 8/18* (2006.01)
  *B60T 8/88* (2006.01)
  *B60T 8/92* (2006.01)
  *B60T 17/18* (2006.01)
  *F16D 66/00* (2006.01)
  *B60T 8/32* (2006.01)

(52) U.S. Cl.
  CPC ............ *B60T 8/176* (2013.01); *B60T 8/1725* (2013.01); *B60T 8/1755* (2013.01); *B60T 8/17551* (2013.01); *B60T 8/17555* (2013.01); *B60T 8/1806* (2013.01); *B60T 8/1881* (2013.01); *B60T 8/88* (2013.01); *B60T 8/885* (2013.01); *B60T 8/92* (2013.01); *B60T 17/18* (2013.01); *B60T 17/22* (2013.01); *B60T 8/329* (2013.01); *B60T 2250/06* (2013.01); *B60T 2270/30* (2013.01); *B60T 2270/406* (2013.01); *B60T 2270/411* (2013.01); *B60T 2270/413* (2013.01); *B60T 2270/416* (2013.01); *F16D 2066/001* (2013.01); *F16D 2066/006* (2013.01)

(58) Field of Classification Search
  CPC ...... B60T 8/176; B60T 8/1806; B60T 8/1881; B60T 8/329; B60T 8/88; B60T 8/885; B60T 8/92; F16D 2066/001; F16D 2066/006
  See application file for complete search history.

(56) References Cited

U.S. PATENT DOCUMENTS

| | | | | |
|---|---|---|---|---|
| 6,823,242 | B1* | 11/2004 | Ralph | B60T 17/228 340/682 |
| 6,913,328 | B2* | 7/2005 | Eckert | B60T 8/1708 188/1.11 E |
| 6,920,383 | B2* | 7/2005 | Graf | B60K 31/04 123/350 |
| 7,165,657 | B2* | 1/2007 | Palladino | F16D 66/026 188/1.11 E |
| 7,244,003 | B2 | 7/2007 | Larson | |
| 8,321,116 | B2 | 11/2012 | Lingman et al. | |
| 8,818,681 | B1* | 8/2014 | Dolgov | G05D 1/0055 701/96 |
| 8,930,114 | B1* | 1/2015 | Reid | B60T 8/323 280/204 |
| 9,026,311 | B1* | 5/2015 | Pieronek | B60W 10/18 280/455.1 |
| 9,440,632 | B2 | 9/2016 | Bennett | |
| 9,652,903 | B2* | 5/2017 | Macnamara | G07C 5/0808 |
| 9,738,125 | B1* | 8/2017 | Brickley | H04W 4/70 |
| 2002/0017986 | A1* | 2/2002 | Causley | B60T 7/16 340/453 |
| 2004/0041464 | A1* | 3/2004 | Eckert | B60T 8/1708 303/7 |
| 2005/0067887 | A1* | 3/2005 | Nilsson | B60T 8/885 303/20 |
| 2007/0173983 | A1* | 7/2007 | Takahashi | B60R 1/00 701/1 |
| 2014/0156133 | A1* | 6/2014 | Cullinane | B60W 30/00 701/23 |
| 2015/0005982 | A1* | 1/2015 | Muthukumar | B60T 1/10 701/1 |
| 2015/0151729 | A1* | 6/2015 | Yamasoe | B60T 7/042 303/122.03 |
| 2015/0239448 | A1* | 8/2015 | O'Meachair | B60T 8/172 701/70 |
| 2015/0240895 | A1* | 8/2015 | Shin | F16D 66/00 701/29.4 |
| 2016/0090071 | A1* | 3/2016 | Tuhro | B60T 8/172 701/70 |
| 2016/0318497 | A1* | 11/2016 | Wright | B60T 17/228 |
| 2016/0328889 | A1* | 11/2016 | Macnamara | G07C 5/0808 |
| 2016/0356331 | A1* | 12/2016 | Bill | H02P 29/60 |
| 2016/0362118 | A1* | 12/2016 | Mollicone | B60W 40/09 |
| 2017/0072932 | A1* | 3/2017 | Steward | B60T 17/221 |
| 2017/0080909 | A1* | 3/2017 | Kim | B60T 7/122 |
| 2017/0082164 | A1* | 3/2017 | Serra | F16D 55/226 |
| 2017/0166178 | A1* | 6/2017 | Masuda | B60T 7/12 |
| 2017/0305577 | A1* | 10/2017 | Bill | B64F 5/60 |
| 2017/0372431 | A1* | 12/2017 | Perl | G06Q 20/10 |
| 2018/0229698 | A1* | 8/2018 | Salmon | B60T 17/22 |
| 2018/0274614 | A1* | 9/2018 | Crum | B60T 8/172 |
| 2019/0023252 | A1* | 1/2019 | Miller, Jr. | B60T 8/17 |

FOREIGN PATENT DOCUMENTS

| | | |
|---|---|---|
| EP | 0 329 373 A1 | 8/1989 |
| EP | 1 359 076 A1 | 11/2003 |
| EP | 2 848 479 A2 | 3/2015 |

* cited by examiner

BRAKE ADJUSTMENT DETECTION USING WSS BASED THERMAL MEASUREMENT

BACKGROUND

The present application finds particular application in commercial vehicle brake systems. However, it will be appreciated that the described techniques may also find application in other vehicle safety systems, or other vehicle braking systems.

When conventional commercial vehicle brakes are out of adjustment, without driver inspection they may go undetected thereby detrimentally impact vehicle braking performance. Under-adjusted brakes which do not deliver as much brake pressure as desired may increase stopping distance. Over-adjusted brakes may overheat, impacting braking performance and damaging components.

Conventional brake monitoring approaches involve estimating rotor temperature based on wheel speed. As the vehicle is further decelerated during braking, the rotor temperature estimate is updated based on an estimated active cooling value and vehicle load. The rotor temperature estimate is used to warn the driver and assist with braking determinations.

The present innovation provides new and improved systems and methods that facilitate detecting a maladjusted brake using temperature measured at the wheel end and adjusting pressure applied by the maladjusted brake to improve safety and mitigate overheating, which overcome the above-referenced problems and others.

SUMMARY

In accordance with one aspect, a system that facilitates identifying and compensating for a maladjusted brake component in a commercial vehicle comprises a plurality of wheel speed sensor inputs for receiving wheel speed sensor signals from a plurality of associated wheel speed sensors installed at associated wheel ends, each comprising a brake component. The system further comprises a processor with control logic configured to receive a resistance value of an individual wheel speed sensor, and determine a temperature of the individual wheel speed sensor as a function of the resistance value and ambient temperature. The control logic is further configured to compare the determined temperature to a predefined expected temperature range for the received resistance value, and if the determined temperature is not in the predefined expected temperature range, compare the determined temperature to at least one other determined wheel speed sensor temperature. Additionally, the control logic is configured to determine that the determined temperature is not within a predefined percentage of the at least one other determined wheel speed sensor temperature, and generate and transmit an adjustment signal to a maladjusted brake to compensate for the maladjustment.

In accordance with another aspect, a processor comprising control logic for identifying and compensating for a maladjusted brake component on a commercial vehicle is configured to receive resistance values of a plurality of individual wheel speed sensors located at respective wheel ends of the commercial vehicle, each wheel end comprising a brake component, and further configured to determine a temperature of the individual wheel speed sensor as a function of the resistance value and ambient temperature. The processor is further configured to compare the determined temperature to a predefined expected temperature range for the received resistance value, and if the determined temperature is not in the predefined expected temperature range, compare the determined temperature to at least one other determined wheel speed sensor temperature. Additionally, the control logic is configured to determine that the determined temperature is not within a predefined percentage of the at least one other determined wheel speed sensor temperature, and generate and transmit an adjustment signal to a maladjusted brake to compensate for the maladjustment.

In accordance with another aspect, a method of identifying and compensating for a maladjusted brake component on a commercial vehicle comprises receiving resistance values of a plurality of individual wheel speed sensors located at respective wheel ends of the commercial vehicle, each wheel end comprising a brake component, and determining a temperature of the an individual wheel speed sensor as a function of its resistance value and ambient temperature. The method further comprises comparing the determined temperature to a predefined expected temperature range for the received resistance value, and if the determined temperature is not in the predefined expected temperature range, comparing the determined temperature to at least one other determined wheel speed sensor temperature. Additionally, the method comprises determining that the determined temperature is not within a predefined percentage of the at least one other determined wheel speed sensor temperature, and generating and transmitting an adjustment signal to a maladjusted brake to compensate for the maladjustment.

In accordance with another aspect, an apparatus that facilitates identifying and compensating for a maladjusted brake component in a commercial vehicle comprises means for receiving wheel speed sensor signals from a plurality of associated wheel speed sensors installed at associated wheel ends, each wheel end comprising a brake component, and further comprising means for receiving a resistance value of an individual wheel speed sensor, and means for determining a temperature of the individual wheel speed sensor as a function of the resistance value and ambient temperature. The apparatus further comprises means for comparing the determined temperature to a predefined expected temperature range for the received resistance value, and if the determined temperature is not in the predefined expected temperature range, comparing the determined temperature to at least one other determined wheel speed sensor temperature. Additionally, the apparatus comprises means for determining that the determined temperature is not within a predefined percentage of the at least one other determined wheel speed sensor temperature, and means for generating and transmitting an adjustment signal to a maladjusted brake to compensate for the maladjustment.

One advantage is that maladjusted brakes can be detected without manual inspection.

Another advantage is that vehicle safety is improved.

Another advantage is that brake component life is extended.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which facilitate using a brake application estimated temperature for comparison to an actual temperature measured as a function the wheel speed sensor resistance or directly by a temperature sensor at the wheel end. The brake temperature as measured by the wheel speed sensor is used in conjunction with a thermal model based in the brake controller to detect a maladjusted brake condition.

Figure 1:
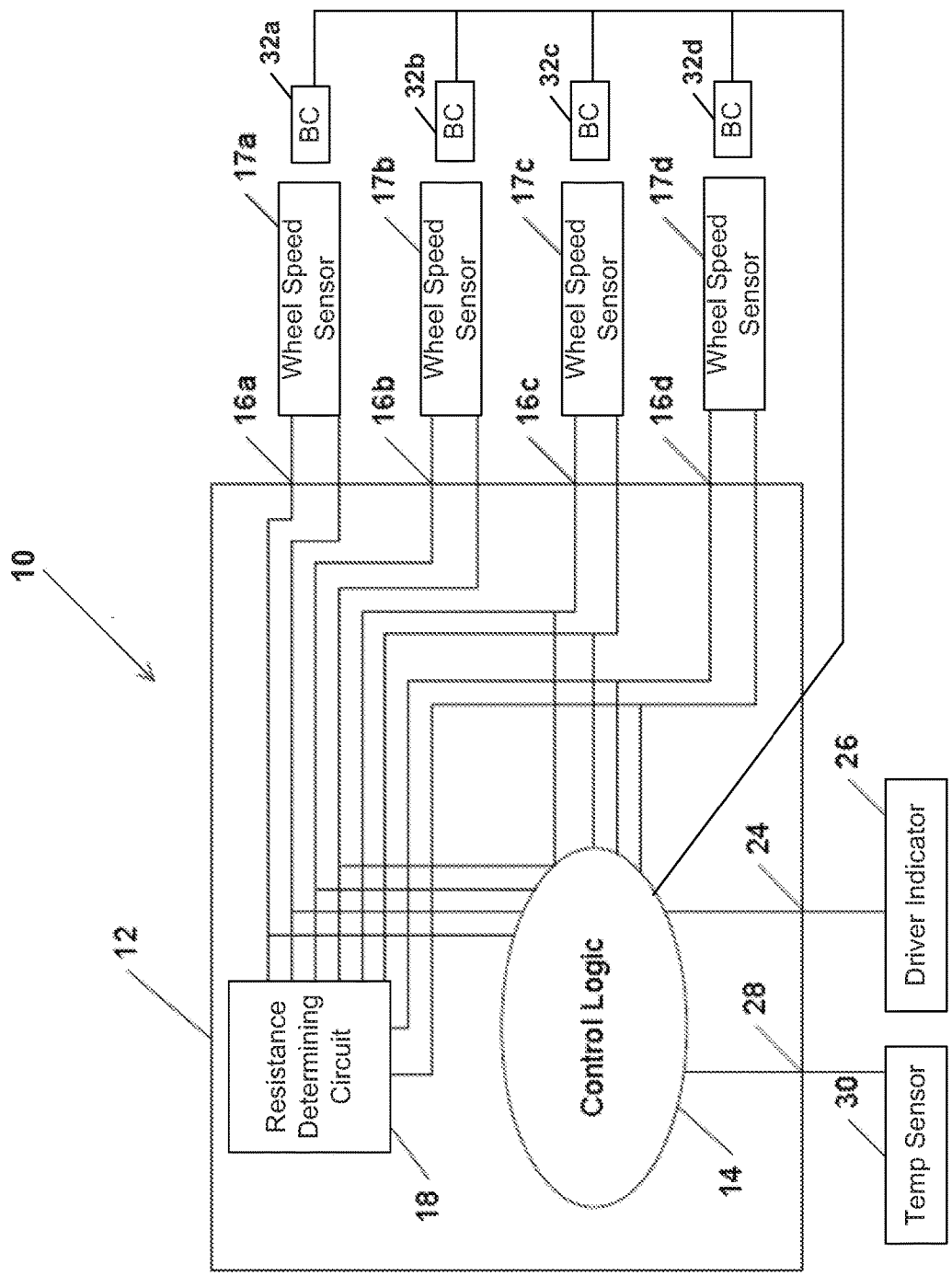
FIG. 1 illustrates a system that facilitates detecting a maladjusted brake condition on a commercial vehicle based on temperature measured by wheel speed sensors at each wheel end, in accordance with one or more aspects described herein.

FIG. 1 illustrates a system 10 that facilitates detecting a maladjusted brake condition on a commercial vehicle based on temperature measured by wheel speed sensors at each wheel end, in accordance with one or more aspects described herein. The brake temperature as measured by the wheel speed sensor can be used in conjunction with a thermal model based in the brake controller to detect an under-adjusted or over-adjusted brake. A properly adjusted brake system absorbs a specific amount of energy for a given brake type, application pressure, and wheel speed. For instance, if the brake temperature (as detected by the wheel speed sensor) is below the modeled system temperature for a predetermined number of brake applications that are above predetermined pressure and predetermined speed, then the control logic notifies the operator that the braking system is out of adjustment-under adjusted.

Similarly, this approach can be applied to detect an over-adjusted foundation brake. Fundamentally, the brake controller knows when the driver applies the brakes and the speed of the vehicle. The brake controller calculates the distance the vehicle has traveled using the wheel speed information and monitors the foundation braking using, e.g., the electronic stability program (ESP) Brake Demand Pressure Sensors (BDPS). The thermal model indicates when the brakes are sufficiently cool from the last braking event. This information is compared to the detected wheel speed sensor based brake temperature. When the measured temperature is greater than the estimated temperature, then an over-adjusted brake is indicated. Thus, using resistance information form the existing wheel speed sensors, the number of brake applications, and distance traveled, the actual brake temperature can be estimated and compared to a brake temperature inferred from the wheel speed sensor resistance.

The system 10 includes a plurality of wheel speed sensors 17a, 17b, 17c, 17d. There may be more or fewer wheel speed sensors depending on the configuration of the commercial vehicle, such as whether the commercial vehicle is a tractor trailer combination vehicle. Each wheel speed sensor 17a, 17b, 17c, 17d is installed as part of the braking system at each individual wheel end, each of which comprises at least one brake component (BC) 32a, 32b, 32c, 32d for which a determination is made regarding whether a maladjustment condition exists. In one embodiment, there may be one wheel speed sensor per wheel end. In another embodiment, the wheel speed sensors may be installed on only one axle of a tandem axle tractor or trailer. The wheel speed sensor 17a, 17b, 17c, 17d is installed proximate to an associated exciter ring at each wheel end (not shown).

Each wheel speed sensor 17a, 17b, 17c, 17d has a nominal resistance value. For example, each wheel speed sensor 17a, 17b, 17c, 17d may have a nominal resistance value of about 1200 ohms, representing the resistance of the wheel speed sensor when exposed to a temperature of about 25° C. Each wheel speed sensor 17a, 17b, 17c, 17d transmits a wheel speed signal at a frequency indicative of the speed of rotation of the wheel end. The amplitude of the wheel speed signal is indicative of the distance the wheel speed sensor 17a, 17b, 17c, 17d is from the associated exciter ring. In one embodiment, the wheel speed sensors 17a, 17b, 17c, 17d may be of the type WS-24™ wheel speed sensors from Bendix Commercial Vehicle Systems LLC of Elyria, Ohio.

The system 10 further includes a controller 12 configured to determine a maladjusted brake condition. The controller 12 may also include functionality for antilock braking or stability control. The controller 12 includes a plurality of wheel speed inputs, such as four wheel speed inputs 16a, 16b, 16c, 16d, for receiving individual wheel speed sensor signals from wheel speed sensors 17a, 17b, 17c, 17d. The location of installation of wheel speed sensor 17a at the front left wheel end of the vehicle is known by its connection to the wheel speed sensor input 16a, which is associated with the front left wheel end of the vehicle, for example. The controller 12 includes as many wheel speed inputs as there are wheel speed sensors in the system 10.

The controller 12 may include a resistance determining circuit 18 for determining the resistance value of the wheel speed sensors 17a, 17b, 17c, 17d connected to the controller 12 at the four wheel speed inputs 16a, 16b, 16c, 16d. The resistance determining circuit 18 may be an analog circuit or an application specific integrated circuit.

The controller 12 includes an output 24 for communicating a signal indicating a maladjusted brake condition. The output 24 may be connected to a driver indicator device 26, or may communicate with a vehicle communications bus (not shown). The driver indicator device 26 may be a lamp or other display device that will indicate a maladjusted brake condition.

The controller 12 may include an input 28 for receiving a signal indicative of the ambient temperature around the vehicle from an ambient temperature sensor 30. The temperature sensor 30 is located on the vehicle at a location away from any of the wheel speed sensors and should not be located near a vehicle component that generates heat as part of the vehicle operation. Alternatively, the ambient temperature value may be available from another controller and received over the vehicle communications bus.

The controller 12 includes a processor having control logic 14 for performing the maladjusted brake condition determining functions. The control logic 14 communicates with four wheel speed sensor inputs 16a, 16b, 16c, 16d, the resistance determining circuit 18 and the output 24. The control logic 14 of the controller 12 receives wheel speed signal information via the wheel speed sensor inputs 16a, 16b, 16c, 16d. From the wheel speed signal information, the control logic 14 determines individual wheel speed, the speed of the vehicle and an air gap speed limit indicative of the air gap that exists between each wheel speed sensor and the associated exciter ring. The control logic 14 receives the resistance value of each individual wheel speed sensor from the resistance determining circuit 18. From the resistance value, the control logic 14 determines a temperature value of each wheel speed sensor location, such as by performing a table lookup that correlates resistance to temperature while accounting or adjusting for ambient temperature measured by the temperature sensor 30. In one embodiment, the control logic 14 may use the information from the ambient temperature sensor 30 in determining an ambient compensated low resistance threshold and first and second high resistance threshold. The control logic 14 sends a signal indicative of the condition of each wheel end via the control output 24. The control logic 14 may also include a timer.

Once the control logic 14 has determined the temperature at a given wheel speed sensor 17*a*, 17*b*, 17*c*, 17*d*, the control logic compares the temperature to a predefined temperature range between first and second temperature thresholds defined by a thermal model (see, e.g., FIG. 4), which may be adjusted for ambient temperature, in order to determine whether the determined temperature is within the predefined range. A temperature that is above the predefined range (i.e., above the second predetermined threshold) can indicate that the brake at the wheel at which the given speed sensor is located is over-adjusted, causing the brake to apply too much force and thus overheat. A temperature that is below the predefined range (i.e., below the first predetermined threshold) can indicate that the brake is under-adjusted, causing the brake to provide insufficient brake force.

If the temperature at a given wheel speed sensor is determined to be outside the predefined temperature range, the temperature at the given wheel speed sensor is compared by the control logic 14 to one or more other wheel speed sensor temperatures to identify a high or low speed sensor temperature relative to the other speed sensor temperature(s). The comparison can be made, for instance, between left and right wheel ends on a common axle, between wheel ends on different axles on a common side of the vehicle, between the instant wheel speed sensor and all other wheel speed sensors, etc. For instance, if the wheel speed sensor on the right (passenger) side of the wheel end of the steering axle has a temperature that is outside the predefined rage, then its temperature can be compared to the temperature determined at the wheel speed sensor on the left (driver) side of the steering axle.

A speed sensor temperature that is above (e.g., 5% higher, 10% higher, or some other predetermined percentage, etc.) the other speed sensors' temperatures to which the given wheel speed sensor's temperature is compared indicates that the brake at the wheel end at which the high-temperature speed sensor is located is over-adjusted, causing the brake to apply too much force and thus overheat. A temperature that is below (e.g., 5% lower, 10% lower, or some other predetermined percentage, etc.) the other speed sensors' temperatures indicates that the brake is under-adjusted, causing the brake to provide insufficient brake force.

In the event of an under-adjusted brake, the control logic 14 transmits an adjustment signal to the maladjusted brake and/or other properly adjusted brakes. For instance, in the case of an under-adjusted brake, an adjustment signal is transmitted to cause the brake to apply additional force in order to bring the brake force up to a level consistent with a properly-adjusted brake. In the case of an over-adjusted brake, the adjustment signal is configured to cause the brake to reduce its braking force to prevent overheating. In this case, additional adjustment signals can be sent to properly adjusted brakes to cause them to apply additional force in order to compensate for the reduced brake force at the over-adjusted brake.

The adjustment signal sent to an over-adjusted brake may comprise a command to modulate the application of the over-adjusted brake in a manner that still provides driver requested brake force to the wheel end but reduces total application time to mitigate overheating. For instance, the over-adjusted brake can be modulated to have a duty cycle of, e.g., 75% or some other predetermined or dynamically determined duty cycle. According to an example, the over-adjusted brake can be modulated to apply force for 0.75 seconds and then release for 0.25 seconds, repeatedly. In this manner, heat generation is reduced, and the repeated engagement and disengagement of the brake provides haptic feedback to the driver, in addition to any visible indicators that may be provided to the driver (e.g., a lamp or indictor in the vehicle cab). The duty cycle used to modulate the over-adjusted brake may be adjusted to be larger or smaller as a function of vehicle load as well as to make the haptic feedback more perceptible to the driver. Additionally, force applied at properly-adjusted brakes may be increased to compensate for the force reduction caused at the modulated brake.

In another embodiment, the duty cycle can be reduced incrementally at predefined intervals. For instance, when the measured temperature indicates an over-adjusted brake, the duty cycle for application of that brake during a braking event can be reduced to 0.9 for, e.g., 10 seconds. If the temperature subsequently measured at the wheel speed sensor for that wheel end is still above the predetermined second threshold as defined by the thermal model, then the duty cycle can be reduced to 0.8 for an additional 10 seconds, and so on. Once the measured temperature is within the range specified by the thermal model, the duty cycle can be stabilized and brake temperature maintained until the vehicle can be serviced. Additionally, this feature provides variable haptic feedback to the driver, which can be indicative of the severity of the over-adjustment since a smaller duty cycle correlates to larger braking interruptions that can be felt by the driver.

It will be understood that the control logic 14 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 14. Additionally, "module," as used herein denotes a set of computer-executable instructions (e.g., a routine, sub-routine, program, application, or the like) that is persistently stored on the computer-readable medium or memory for execution by the processor.

In another embodiment, the temperature at each wheel end is measured by a dedicated temperature sensor. The measured temperature is compared by the control logic 14 to first and second predetermined thresholds defined by the thermal model. When the measured temperature is below the first predetermined threshold, the brake is determined to be under-adjusted and the control logic sends an adjustment signal to increase brake force at the maladjusted brake as described above with regard to FIG. 1. When the measured temperature is above the second predetermined threshold, the brake is determined to be over-adjusted and the control logic sends an adjustment signal to reduce brake force at the maladjusted brake as described above with regard to FIG. 1.

Figure 2:
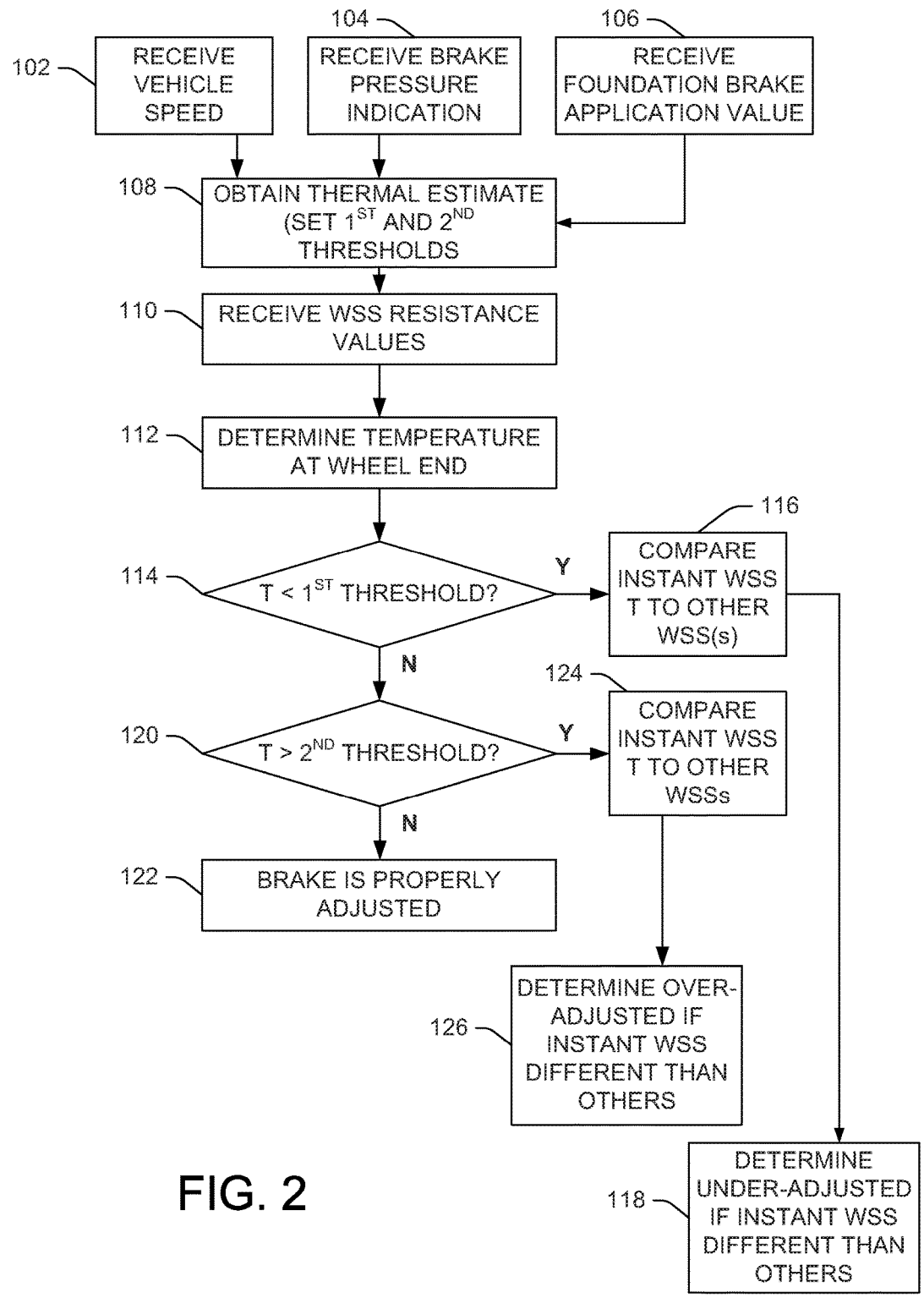
FIG. 2 illustrates a method for identifying and compensating for a maladjusted brake on a commercial vehicle, in accordance with one or more features described herein.

FIG. 2 illustrates a method for identifying and compensating for a maladjusted brake on a commercial vehicle, in accordance with one or more features described herein. At 102, vehicle speed information is received. An indication of brake pressure application is received at 104. At 106, a foundation brake application value is received. At 108, the vehicle speed information, brake pressure information, and foundation brake application value are employed to generate or obtain a thermal estimate of the temperature(s) at the wheel ends of the vehicle, which is used to set first and second predetermined temperature thresholds (which are subsequently respectively employed at 114 and 120).

At 110, resistance values from a plurality of individual wheel speed sensors located at respective wheel ends of the commercial vehicle are received. At 112, a temperature of an individual wheel speed sensor is determined as a function of its resistance value and ambient temperature at the vehicle. At 114, a determination is made regarding whether the determined temperature is below the first predetermined temperature threshold. When the determined temperature is below the first predetermined temperature threshold, then at 116 a comparison is made between the instant wheel speed sensor temperature and the temperature of at least one other wheel speed sensor on the vehicle. The comparison can be made, for instance, between left and right wheel ends on a common axle, between wheel ends on different axles on a common side of the vehicle, between the instant wheel speed sensor and all other wheel speed sensors, etc. At 118, a determination is made that the maladjustment condition is an under-adjusted condition if the instant wheels speed sensor temperature is different than the temperature of the other wheel speed sensor(s) to which it is compared, and an adjustment signal is generated and transmitted. The adjustment signal comprises instructions to increase brake force at the maladjusted brake by a predetermined amount as a function of a difference between the determined temperature and the first predetermined temperature threshold.

If the determined temperature is not below the first predetermined threshold, then at 120 a determination is made regarding whether the determined temperature is above a second predetermined temperature threshold, which is higher than the first predetermined temperature threshold. If not, then at 122 the brake at the wheel end associated with the given wheel speed sensor is determined to be properly adjusted. When the determined temperature is above the second predetermined temperature threshold, then at 124 a comparison is made between the instant wheel speed sensor temperature and the temperature of at least one other wheel speed sensor on the vehicle on the vehicle. The comparison can be made, for instance, between left and right wheel ends on a common axle, between wheel ends on different axles on a common side of the vehicle, between the instant wheel speed sensor and all other wheel speed sensors, etc. At 126 a determination is made that the maladjustment condition is an over-adjusted condition if the instant wheels speed sensor temperature is different than the temperature of the other wheel speed sensor(s) to which it is compared, and an adjustment signal is generated and transmitted. The adjustment signal may comprise instructions to decrease brake force at the maladjusted brake by a predetermined amount as a function of a difference between the determined temperature and the second predetermined temperature threshold.

In another embodiment, adjustment signals can be sent to one or more properly-adjusted brakes to compensate for the adjustment to the maladjusted brake. For instance, if brake force is reduced at the maladjusted brake, then brake force at the properly-adjusted brakes can be increased to compensate.

Figure 3:
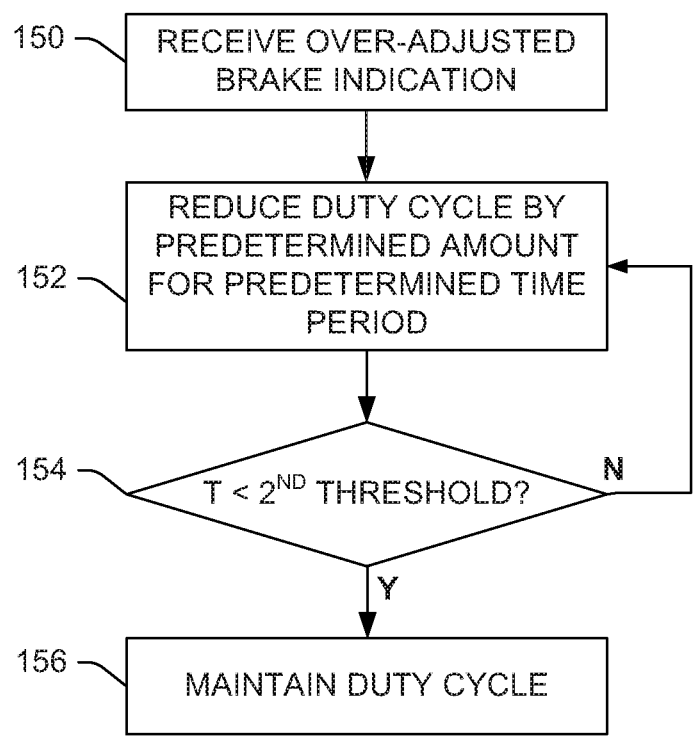
FIG. 3 illustrates a method of modulating brake force at an over-adjusted brake.

FIG. 3 illustrates a method of modulating brake force at an over-adjusted brake to reduce brake temperature to an acceptable level to mitigate the potential for a hazardous condition until the vehicle can be safely stopped and/or properly serviced. At 150, a brake controller receives an indication of an over-adjusted brake as determined from temperature measured at the wheel end where the brake is located. The indication indicates that the temperature measured at the wheel end is above a predetermined temperature threshold such as the second predetermined temperature threshold described with regard to FIGS. 1 and 2. At 152, a duty cycle for application of the brake is reduced so that brake application is modulated in order to reduce heat generation. At 154, after a predetermined time period, temperature at the wheel end is re-measured, and a determination is made regarding whether the measured temperature is below the second predetermined threshold. If not, then the method reverts to 152 for further iteration until the temperature at the wheel end is below the second predetermined threshold. Once this occurs, then at 156, the duty cycle is stabilized until the vehicle can be stopped and/or serviced.

Figure 4:
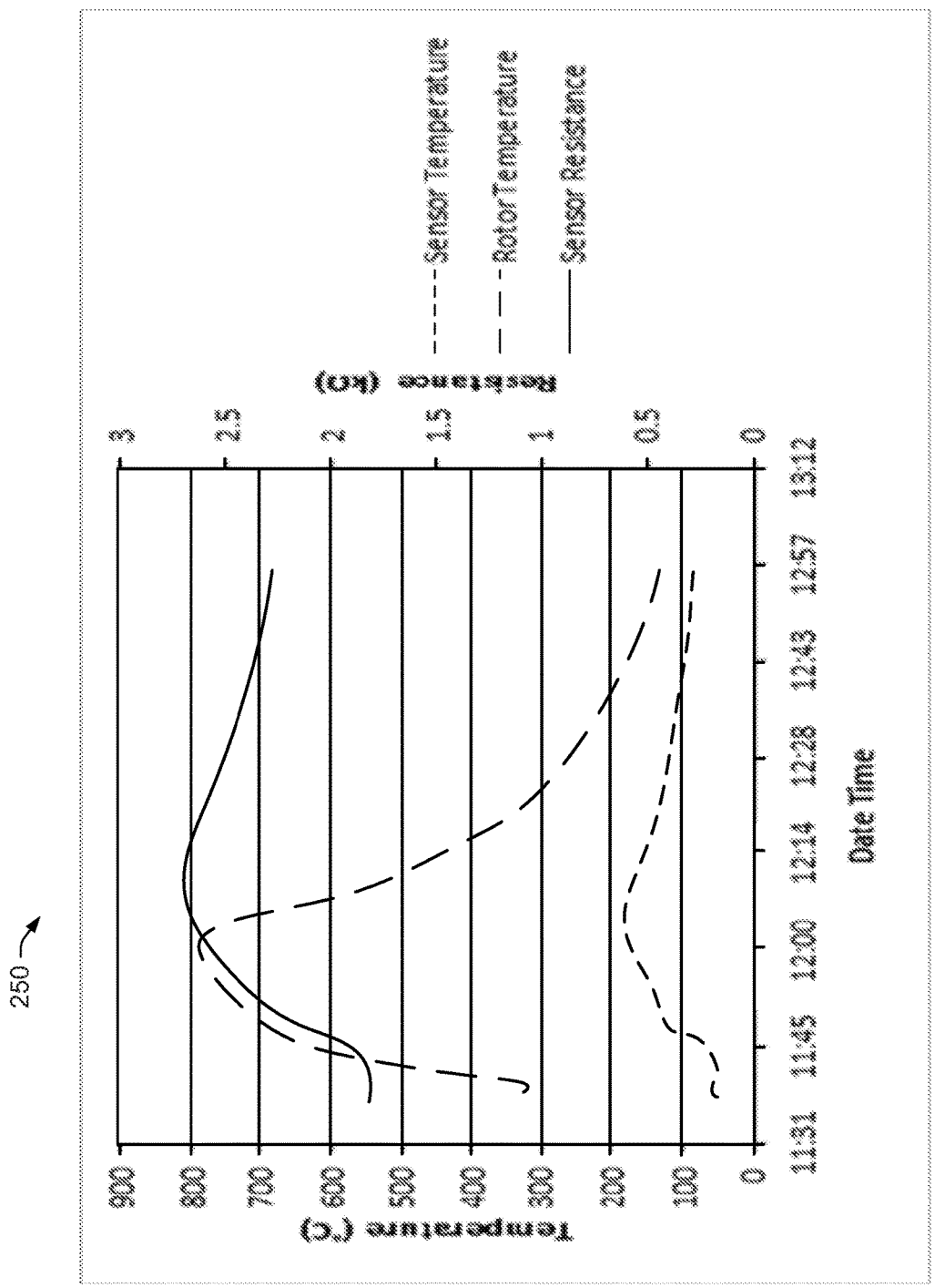
FIG. 4 illustrates a graph that shows a proportional relationship between sensor temperature (short-dashed line), sensor resistance (solid line) and rotor temperature (long-dashed line), in accordance with various aspects described herein.

FIG. 4 illustrates a graph 250 that shows a proportional relationship between sensor temperature (short-dashed line), sensor resistance (solid line) and rotor temperature (long-dashed line), after a brake application (at about time 11:38) and a brake release (at about time 12:00) in accordance with various aspects described herein. A thermal model based on the relationship represented by the graph 250 can be used, for example, in conjunction with the system of FIG. 1 or the method of FIG. 2 when defining the first and second predetermined thresholds. For example, a first predetermined threshold can be set at 150 degrees Celsius. According to FIG. 4, the sensor resistance is expected to be about 2.4 kiloohms at 150 degrees Celsius. Therefore temperature at the wheel end can be deduced using the thermal model and resistance of the wheel speed sensor received at the controller. However, the herein-described systems and methods are not limited to the thermal model represented by the graph 250, and other thermal models may be used in conjunction with the herein-described systems and methods as will be appreciated by those of skill in the art.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

The invention claimed is:

1. A system that facilitates identifying and compensating for a maladjusted brake component in a commercial vehicle, comprising:
    a plurality of wheel speed sensor inputs for receiving wheel speed sensor signals from a plurality of associated wheel speed sensors installed at associated wheel ends each comprising a brake component; and
    a processor with control logic, the control logic being configured to:
        receive a resistance value of an individual wheel speed sensor;
        determine a temperature of the individual wheel speed sensor as a function of the resistance value and ambient temperature;
        compare the determined temperature to a predefined expected temperature range for the received resistance value;
        if the determined temperature is not in the predefined expected temperature range, compare the determined temperature to at least one other determined wheel speed sensor temperature;

determine that the determined temperature is not within a predefined percentage of the at least one other determined wheel speed sensor temperature; and generate and transmit an adjustment signal to the maladjusted brake component to compensate for the maladjustment.

2. The system according to claim 1, wherein when the determined temperature is below a first predetermined temperature threshold, the control logic is further configured to determine that the maladjusted brake component is in an under-adjusted brake component, and the adjustment signal comprises instructions to increase brake force at the maladjusted brake component by a predetermined amount as a function of a difference between the determined temperature and the first predetermined temperature threshold.

3. The system according to claim 1, wherein when the determined temperature is above a second predetermined temperature threshold, the control logic is further configured to determine that the maladjustment brake component is in an over-adjusted condition.

4. The system according to claim 3, wherein the adjustment signal comprises instructions to decrease brake force at the maladjusted brake component by a predetermined amount as a function of a difference between the determined temperature and the second predetermined temperature threshold.

5. The system according to claim 4, wherein the adjustment signal comprises instructions to decrease the brake force at the maladjusted brake component by modulating brake application such that the maladjusted brake component is not continuously actuated during a braking event.

6. The system according to claim 4, wherein the adjustment signal comprises instructions to decrease the brake force at the maladjusted brake component by reducing a duty cycle of the maladjusted brake component until the determined temperature falls below the second predetermined threshold.

7. The system according to claim 6, wherein adjustment signal comprises instructions to reduce the duty cycle of the maladjusted brake component in predefined increments at predefined intervals until the determined temperature is below the second predetermined threshold.

8. The system according to claim 1, wherein the control logic is further configured to generate and transmit one or more additional adjustment signals to one or more properly adjusted brake components to increase brake force at the properly-adjusted brake components when the maladjusted brake component is determined to be an under-adjusted brake component.

9. The system according to claim 1, wherein the control logic is further configured to transmit an alert signal to alert a driver of the vehicle upon detection of a maladjusted brake component.

10. A processor comprising control logic for identifying and compensating for a maladjusted brake component on a commercial vehicle, the control logic being configured to:

receive a resistance values of a plurality of individual wheel speed sensors located at respective wheel ends of the commercial vehicle, each wheel end comprising a brake component;

determine a temperature of the individual wheel speed sensor as a function of the resistance value and ambient temperature;

compare the determined temperature to a predefined expected temperature range for the received resistance value;

if the determined temperature is not in the predefined expected temperature range, compare the determined temperature to at least one other determined wheel speed sensor temperature;

determine that the determined temperature is not within a predefined percentage of the at least one other determined wheel speed sensor temperature; and generate and transmit an adjustment signal to the maladjusted brake component to compensate for the maladjustment.

11. The processor according to claim 10, wherein when the determined temperature is below a first predetermined temperature threshold, the control logic is further configured to determine that the maladjusted brake component is an under-adjusted brake component, and the adjustment signal comprises instructions to increase brake force at the maladjusted brake component by a predetermined amount as a function of a difference between the determined temperature and the first predetermined temperature threshold.

12. The processor according to claim 10, wherein when the determined temperature is above a second predetermined temperature threshold, the control logic is further configured to determine that the maladjusted brake component is an over-adjusted brake component.

13. The processor according to claim 12, wherein the adjustment signal comprises instructions to decrease brake force at the maladjusted brake component by a predetermined amount as a function of a difference between the determined temperature and the second predetermined temperature threshold.

14. The processor according to claim 13, wherein the adjustment signal comprises instructions to decrease the brake force at the maladjusted brake component by modulating brake application such that the maladjusted brake component is not continuously actuated during a braking event.

15. The processor according to claim 13, wherein the adjustment signal comprises instructions to decrease the brake force at the maladjusted brake component by reducing a duty cycle of the maladjusted brake component to a level the determined temperature to fall below the second predetermined threshold.

16. The processor according to claim 15, wherein adjustment signal comprises instructions to reduce the duty cycle of the maladjusted brake component in predefined increments at predefined intervals until the determined temperature is below the second predetermined threshold.

17. The processor according to claim 10, wherein the control logic is further configured to generate and transmit one or more additional adjustment signals to one or more properly adjusted brake components to increase brake force at the properly-adjusted brake components when the maladjusted brake component is determined to be an under-adjusted brake component.

18. The processor according to claim 10, wherein the control logic is further configured to transmit an alert signal to alert a driver of the vehicle upon detection of a maladjusted brake component.

19. A method of identifying and compensating for a maladjusted brake component on a commercial vehicle, the method comprising:

receiving a resistance values of a plurality of individual wheel speed sensors located at respective wheel ends of the commercial vehicle, each wheel end comprising a brake component;

determining a temperature of an individual wheel speed sensor as a function of its resistance value and ambient temperature;

comparing the determined temperature to a predefined expected temperature range for the received resistance value;

if the determined temperature is not in the predefined expected temperature range, comparing the determined temperature to at least one other determined wheel speed sensor temperature;

determining that the determined temperature is not within a predefined percentage of the at least one other determined wheel speed sensor temperature; and generating and transmitting an adjustment signal to the maladjusted brake component to compensate for the maladjustment.

20. The method according to claim 19, further comprising, when the determined temperature is below a first predetermined temperature threshold, determining that the maladjusted brake component is an under-adjusted brake component, wherein the adjustment signal comprises instructions to increase brake force at the maladjusted brake component by a predetermined amount as a function of a difference between the determined temperature and the first predetermined temperature threshold.

21. The method according to claim 19, further comprising, when the determined temperature is above a second predetermined temperature threshold, determining that the maladjusted brake component is an over-adjusted brake component.

22. The method according to claim 21, wherein the adjustment signal comprises instructions to decrease brake force at the maladjusted brake component by a predetermined amount as a function of a difference between the determined temperature and the second predetermined temperature threshold.

23. The method according to claim 21, wherein the adjustment signal comprises instructions to decrease the brake force at the maladjusted brake component by reducing a duty cycle of the maladjusted brake component to a level the determined temperature to fall below the second predetermined threshold.

24. The method according to claim 23, wherein adjustment signal comprises instructions to reduce the duty cycle of the maladjusted brake component in predefined increments at predefined intervals until the determined temperature is below the second predetermined threshold.

25. The method according to claim 19, further comprising generating and transmitting one or more additional adjustment signals to one or more properly adjusted brake components to increase brake force at the properly-adjusted brake components when the maladjusted brake component is determined to be an under-adjusted brake component.

26. An apparatus that facilitates identifying and compensating for a maladjusted brake component in a commercial vehicle, comprising:

means for receiving wheel speed sensor signals from a plurality of associated wheel speed sensors installed at associated wheel ends, each wheel end comprising a brake component; and means for receiving a resistance value of an individual wheel speed sensor;

means for determining a temperature of the individual wheel speed sensor as a function of the resistance value and ambient temperature;

means for comparing the determined temperature to a predefined expected temperature range for the received resistance value;

wherein if the determined temperature is not in the predefined expected temperature range, the means for comparing compares the determined temperature to at least one other determined wheel speed sensor temperature;

means for determining that the determined temperature is not within a predefined percentage of the at least one other determined wheel speed sensor temperature; and means for generating and transmitting an adjustment signal to the maladjusted brake component to compensate for the maladjustment.

* * * * *